J. C. MOON.
ART OF WELDING TUBES.
APPLICATION FILED NOV. 27, 1916.
1,229,774.
Patented June 12, 1917.
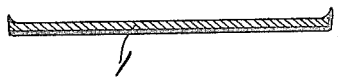
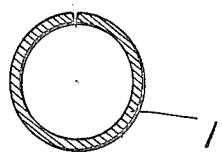
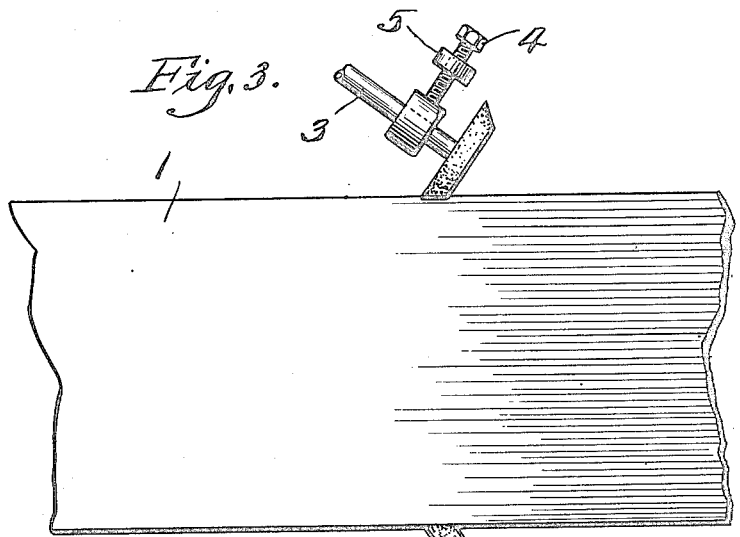
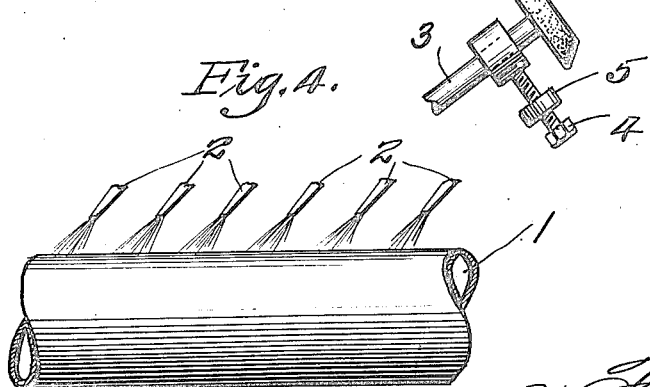
Inventor
John C. Moon

UNITED STATES PATENT OFFICE.

JOHN C. MOON, OF ST. LOUIS, MISSOURI.

ART OF WELDING TUBES.

1,229,774. Specification of Letters Patent. Patented June 12, 1917.

Application filed November 27, 1916. Serial No. 133,711.

*To all whom it may concern:*

Be it known that I, JOHN C. MOON, a citizen of the United States, residing at the city of St. Louis, State of Missouri, have invented a certain new and useful Improvement in the Art of Welding Tubes, of which the following is a full, clear, and exact description, such as will enable others skilled in the art to which it appertains, to make and use the same, reference being had to the accompanying drawings, forming part of this specification, in which—

Figure 1 is a cross sectional view of a sheared section of sheet metal which forms the blank from which my improved tubing is made.

Fig. 2 is a cross sectional view showing the finished blank curled into cylindrical form and in readiness to be welded according to my present improvement.

Fig. 3 is a conventional top plan view of my improved method of preparing the edges of the blank which is to be curled and welded.

Fig. 4 is a conventional illustration of the manner of welding the blank after the same has been curled or bent into cylindrical form.

This invention relates to a new and useful method of preparing blanks for welded tubing, the object being to produce a product in the form of a welded tube in which the interior surface or bore is smooth, *i. e.,* a tube in which there are no protuberances resulting from the feathered edges incident to the action of the shears in producing the flat blank. Heretofore the practice has been to shear the flat blank from a sheet of metal, and to curl or bend the same before effecting a welding operation. This shearing operation produces feathered edges which in the welding action form lumps or protuberances on the inner surface of the finished tube; consequently, it is the practice to make the bore slightly larger in diameter than the desired finished product and then to pass the tube over a mandrel and subject it to hammering blows which swage the tube and in reducing its diameter is supposed to smooth its inner surface by eliminating the protuberances above referred to. This purpose is not always successfully accomplished and the result is, that when such tubes are used for pump cylinders such as the well-known hand pump for bicycles and automobiles, the leather cup cannot make close contact with the interior surface of the cylinder at all times, and consequently, by-passes are formed which render the pump inefficient. It is impractical to ream out the bore of such pump cylinders, so it is highly desirable to form them as nearly perfect as possible so as to render the reaming operation unnecessary. As the shearing operation in producing the flat blank from which the tube is formed is responsible for the production of the feathered edges which produce the irregularities in the interior surface or bore of the tube, it is the object of my invention to get rid of these in the early operations of forming the tube.

In the drawings, 1 indicates the flat blank as it is sheared in the usual way, and on the edges $1^a$ of which I have shown, in an exaggerated manner, feathered edges incident to the shearing operation necessary in the production of the blank.

My invention consists in removing the feathers or burs and at the same time beveling the edges of the flat blank which result is accomplished by the use of grinding wheels preferably made of emery or carborundum, and which may be given a vertical action to sweep the entire edge of the blank, if desired, and these wheels are preferably adjustable toward and from the edge of the blank by any suitable mechanism.

In the drawings, two grinding wheels are shown as being mounted on suitable driven shafts 3. 4 are adjusting screws mounted in stationary bearings 5. These grinding wheels not only remove the feathered edges produced by the shears, but are so adjusted relative to the blank that they preferably produce a slight bevel which enables the meeting edges of the curved blank to come more closely together, as shown in Fig. 2, so that when the tube is welded the heat from the welding jets can properly enter the space between the edges to effect the welding action. Of course, the edges of the flat blank can be so beveled that they will practically be parallel when the blank is curved and be forced to close together. But this may not be desirable, as it would prevent the welding jets from entering between and properly heating the surfaces to be welded. According to my invention, it is not necessary, under proper conditions to swage the welded tube, but it will be understood that if such swaging action is desired, the same may be done without in the least departing from the nature and spirit of my invention. It is obvious that instead of using the acetylene burners for effecting the welding operation other methods of welding may be employed, such as by electricity, etc.

What I claim is:

1. The hereindescribed art of preparing flat metal blanks which are to be formed into welded tubes which consists in simultaneously beveling and removing the feathers or burs from the edges of the blank before it is curled to bring said edges together.

2. The hereindescribed method of preparing tubes to be welded consisting in beveling the edges of a section of sheet metal, and then bending said section of metal to bring the beveled edges together to form a substantially V-shaped open seam along which the welding operation is effected.

In testimony whereof I hereunto affix my signature in the presence of two witnesses, this 24th day of November, 1916.

JOHN C. MOON.